(12) United States Patent
Wilde et al.

(10) Patent No.: US 11,292,206 B2
(45) Date of Patent: Apr. 5, 2022

(54) SYSTEMS AND METHODS FOR CREATING A HONEYCOMB CORE WITH VENTING PATHWAYS

(71) Applicant: The Boeing Company, Chicago, IL (US)

(72) Inventors: John C. Wilde, Mill Creek, WA (US);
Xiaoxi Wang, Mukilteo, WA (US);
Jason W. Drexler, Brier, WA (US)

(73) Assignee: The Boeing Company, Chicago, IL (US)

( * ) Notice: Subject to any disclaimer, the term of this patent is extended or adjusted under 35 U.S.C. 154(b) by 193 days.

(21) Appl. No.: 16/363,557

(22) Filed: Mar. 25, 2019

(65) Prior Publication Data
US 2020/0307114 A1 Oct. 1, 2020

(51) Int. Cl.
*B29C 65/52* (2006.01)
*B29L 31/60* (2006.01)
(Continued)

(52) U.S. Cl.
CPC ............ *B29C 65/526* (2013.01); *B29C 66/71* (2013.01); *B32B 3/12* (2013.01); *B32B 3/266* (2013.01); *B41M 3/006* (2013.01); *B29K 2677/10* (2013.01); *B29L 2031/3076* (2013.01); *B29L 2031/608* (2013.01); *B32B 2305/024* (2013.01); *B64C 1/00* (2013.01); *B64C 2001/0072* (2013.01); *B64F 5/10* (2017.01)

(58) Field of Classification Search
CPC ..... B29C 41/14; B29C 65/526; B29C 66/438; B29C 66/71; B29C 66/72525; B29C 66/7254; B29D 24/005; B29D 99/0089; B29K 2277/10; B29K 2677/10; B29L 2031/3076; B29L 2031/608; B31D 3/0223; B31D 3/023; B31D 3/0238; B31D 3/0276; B31D 3/0292; B32B 3/12; B32B 3/266; B32B 7/14; B32B 37/1292; B32B 37/146; B32B 2305/024; B41M 3/006; B64C 1/00; B64C 2001/0072; B64F 5/10
See application file for complete search history.

(56) References Cited

U.S. PATENT DOCUMENTS

| | | |
|---|---|---|
| 2,734,843 A | 2/1956 | Steele |
| 2,828,235 A * | 3/1958 | Holland .................. B32B 15/08 428/118 |

(Continued)

FOREIGN PATENT DOCUMENTS

| | | |
|---|---|---|
| CN | 201971148 | 9/2002 |
| JP | H045033 A | 1/1992 |
| JP | 2511272 B2 | 6/1996 |

OTHER PUBLICATIONS

Edward M. Petrie, "Adhesive Bonding of Polyolefin", Techsil White Paper, Jun. 2013, pp. 1-6, UK.
(Continued)

*Primary Examiner* — Michael A Tolin
(74) *Attorney, Agent, or Firm* — Vivacqua Crane PLLC (57) ABSTRACT

A method for creating a honeycomb core having venting pathways includes controlling where a resin is applied to sheets by creating a resin affinity portion and a resin repellant portion on the sheets. The resin affinity portion and the resin repellant portion forms the venting pathways. A honeycomb substrate is then formed from the sheets.

23 Claims, 9 Drawing Sheets

(51) Int. Cl.
  *B32B 3/12* (2006.01)
  *B32B 3/26* (2006.01)
  *B41M 3/00* (2006.01)
  *B29C 65/00* (2006.01)
  *B64F 5/10* (2017.01)
  *B29L 31/30* (2006.01)
  *B64C 1/00* (2006.01)

(56) References Cited

U.S. PATENT DOCUMENTS

| | | | |
|---|---|---|---|
| 3,655,476 A | | 4/1972 | Siegal |
| 3,660,217 A | | 5/1972 | Kehr et al. |
| 3,895,152 A | | 7/1975 | Carlson et al. |
| 4,299,872 A | | 11/1981 | Miguel et al. |
| 5,137,768 A | * | 8/1992 | Lin ................ D21H 13/26 162/157.3 |
| 5,180,619 A | * | 1/1993 | Landi ............. A61G 5/1043 428/116 |
| 5,401,706 A | | 3/1995 | Fischer |
| 5,445,861 A | | 8/1995 | Newton et al. |
| 5,589,016 A | | 12/1996 | Hoopingarner et al. |
| 5,662,982 A | | 9/1997 | Diez |
| 6,003,283 A | * | 12/1999 | Hull ................ E04C 2/365 52/783.15 |
| 6,153,687 A | | 11/2000 | Wang et al. |
| 6,451,406 B1 | | 9/2002 | Wang et al. |
| 9,640,164 B2 | * | 5/2017 | Gerken ............ G10K 11/172 |
| 10,054,567 B2 | | 8/2018 | Georgeson et al. |
| 2006/0180346 A1 | | 8/2006 | Knight et al. |
| 2006/0231487 A1 | | 10/2006 | Bartley et al. |
| 2008/0044621 A1 | | 2/2008 | Strauss |
| 2008/0145600 A1 | | 6/2008 | Hendren et al. |
| 2008/0317802 A1 | | 12/2008 | Lee et al. |
| 2009/0008142 A1 | | 1/2009 | Shimizu et al. |
| 2009/0311469 A1 | | 12/2009 | Hotzeldt et al. |
| 2013/0224405 A1 | | 8/2013 | Nagerl et al. |
| 2013/0269742 A1 | | 10/2013 | Pingree et al. |
| 2015/0282294 A1 | | 10/2015 | Wakuda et al. |
| 2017/0182723 A1 | | 6/2017 | Calisch et al. |
| 2017/0326858 A1 | | 11/2017 | Wang |
| 2017/0326859 A1 | | 11/2017 | Wang et al. |
| 2018/0186140 A1 | | 7/2018 | Drexler et al. |
| 2020/0307135 A1 | * | 10/2020 | Wilde ................ B29C 65/526 |

OTHER PUBLICATIONS

Steven Label. "Substrate's Dynes/Cm," Available at: https://www.adhesives.org/adhesives-sealants/adhesives-sealants-overview/adhesive-technologies/chemically-curing. Adesives.org Sealants.org (Year: 2018) Chemically Curing, Jan. 19, 2018.[Accessed Sep. 22, 2021].

Adhesives.org. "Chemically Curing," Available at: https://www.stevenlabel.com/resources/dyne-levels. Substrate's Dynes/cm, Steven Label (Year: 2017) [Accessed Sep. 22, 2021].

* cited by examiner

SYSTEMS AND METHODS FOR CREATING A HONEYCOMB CORE WITH VENTING PATHWAYS

INTRODUCTION

The present disclosure relates to systems and methods for creating cores. More specifically, the present disclosure relates to systems and methods for creating cores having venting pathways.

BACKGROUND

Decorative or interior panels and acoustic panels made from a composite part are used in many industries. The composite part includes a honeycomb core with one or more surface plies or laminates applied to the honeycomb core. The honeycomb core separates the surface plies by spacing the surface plies apart and adding thickness to the panel, thus increasing bending strength of the panel. However, during manufacturing of the composite part, especially in Out of Autoclave (OOA) production systems, volatiles are generated and may be sealed inside the composite part since the walls of the honeycomb core may not be permeable or porous enough to allow the volatiles to escape. During the lifetime of the composite part outgassing volatiles may result in quality issues such as bubbling on the decorative surface or delamination.

Various solutions have been provided to address the issue of unvented volatiles in honeycomb cores. These solutions include increasing the processing time to create the composite part in order to allow degassing and adding additional processing steps to score the composite part. However, these solutions may increase the cost of manufacturing.

Thus, there is a need in the art for systems and methods for creating composite parts with cores that permit low cost venting and degassing pathways.

SUMMARY

According to one aspect, a method for creating a honeycomb core having venting pathways is provided. The method includes controlling where a resin is applied to sheets by creating a resin affinity portion and a resin repellant portion on the sheets. The resin repellant portion forms the venting pathways. A honeycomb substrate is then formed from the sheets.

According to another aspect, a method for creating a honeycomb core is provided. The method includes printing a resin material on selective areas on each of a number of sheets, printing an adhesive on each of the sheets, stacking the sheets to form a block, forming a honeycomb substrate from the block, and curing the resin material.

According to yet another aspect, a system is provided having a number of sheets, a first machine for controlling where a resin is applied to the sheets to form venting pathways, a second machine for applying an adhesive onto the sheets, and a third machine for expanding the sheets to form a honeycomb substrate.

The features, functions, and advantages that have been discussed may be achieved independently in various aspects or may be combined in other aspects further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
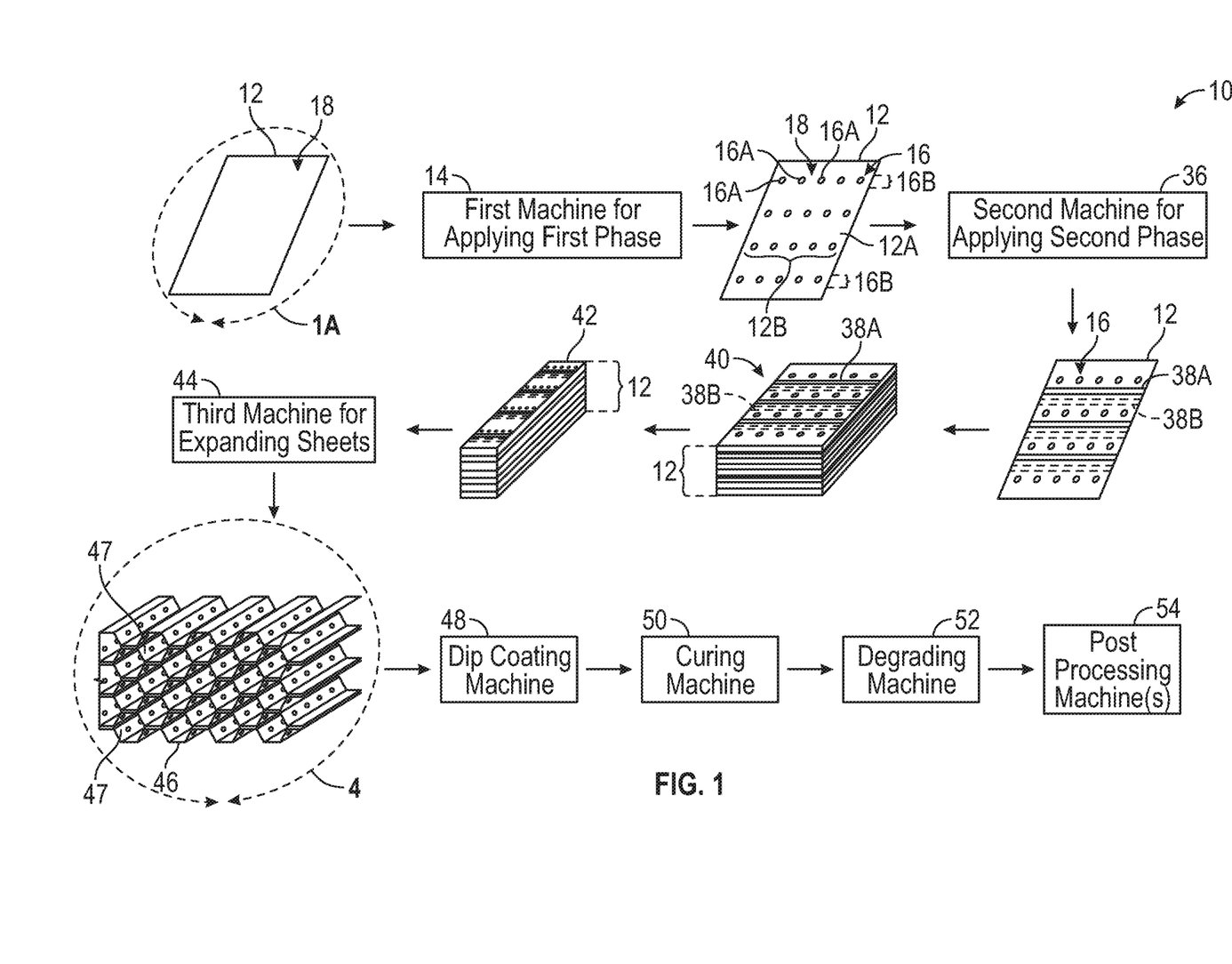
FIG. 1 is a schematic diagram of a system for creating a honeycomb core with venting pathways, according to an exemplary aspect.

Referring to FIG. 1, a schematic diagram of a system 10 for manufacturing a honeycomb core with venting pathways is shown. The system 10 may be employed in the context of aircraft manufacturing and service, as will be described below. For example, the system 10 may be used in component and subassembly manufacturing of an aircraft including interior fabrication, acoustic panels, system integration of the aircraft, airframe fabrication, and routine maintenance and service of the aircraft. However, the system 10 may be used in various other industries, including automotive, construction, graphics, and general transportation industry, to name but a few.

Figure 1A:
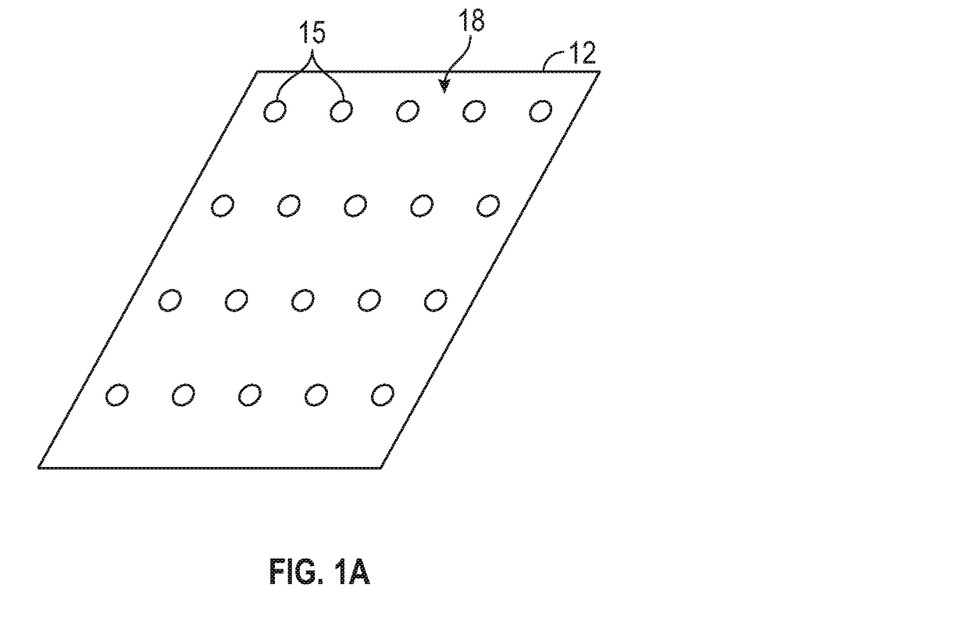
FIG. 1A is an isometric view of a sheet having perforated holes used in the system of FIG. 1, according to an exemplary aspect.

The system 10 includes a sheet 12 that is fed into a first machine 14. The sheet 12 may be roll fed using a roll of material fed in a continuous process (not shown) into the first machine 14 or sheet fed, as illustrated in FIG. 1. The sheet 12 is preferably an aromatic polyamide paper, such as sold under the trademark NOMEX®, that provides mechanical toughness, flexibility and resilience. However, the sheet 12 may be a woven fabric, cellulose paper, plastic, or aluminum without departing from the scope of the present disclosure. The sheet 12 is comprised of a resin repellant material or a resin affinity material. A resin repellant material is a material that prevents a resin, such as phenolic resin, from adhering to the sheet 12. A resin affinity material is a material that allows a resin, such as phenolic resin, to adhere to the sheet 12. The sheet 12 may be porous or non-porous to venting gasses. A sheet 12 which is porous is defined as having an intrinsic permeability of at least $1\times10^{-13}$ m². A sheet 12 which is non-porous is defined as having an intrinsic permeability of greater than $1\times10^{-13}$ m². In the example provided, the sheet 12 is comprised of an aromatic polyamide paper and is thus a resin affinity material and porous. In one aspect, the sheet 12 may be coated with a material that is a resin affinity material or a resin repellant material. In another aspect, the sheet 12 includes a plurality of holes 15, shown in FIG. 1A, that receive the resin repellant material, as will be described below.

The first machine 14 is configured to apply a first phase of treatment onto the sheet 12. The first phase of treatment includes applying one of a resin repellant or a resin affinity material 16 onto the sheet 12 to create a resin affinity portion 12A and a resin repellant portion 12B. In the example where the sheet 12 is a resin affinity material, the first machine 14 applies a resin repellant onto the sheet 12. Thus, exposed areas of the sheet 12 form the resin affinity portion 12A while areas covered by the resin repellant form the resin repellant portion 12B. Where the sheet 12 is a resin repellant material, the first machine 14 applies a resin affinity material onto the sheet 12. Thus, exposed areas of the sheet 12 form the resin repellant portion 12B while areas covered by the resin affinity material form the resin affinity portion 12A. The resin repellant or resin affinity material 16 is applied in a regular pattern onto a surface 18 of the sheet 12. In another aspect, the resin repellant or resin affinity material 16 may be applied in an irregular pattern (not shown). The shape and pattern of the resin repellant or resin affinity material 16 may vary without departing from the scope of the present disclosure. In the example provided, the resin repellant or resin affinity material 16 is disposed on the surface 18 as discrete dots 16A arranged in parallel rows 16B to provide regular venting pathways (not shown in FIG. 1) for each of a column of honeycomb structures, as will be described below. Where the sheet 12 includes holes 15 (FIG. 1A), the resin repellant or resin affinity material 16 is applied into the holes 15 in order to assure that the holes 15 ultimately remain open for venting. In one aspect, the resin repellant or resin affinity material 16 is applied to one side of the sheet 12. In another aspect, the resin repellant or resin affinity material 16 is applied to both sides of the sheet 12 to increase the communication between venting pathways. Examples of resin repellant materials include materials having a surface energy lower than the resin that is to be repelled. One example includes low surface energy wax-based materials such as inkjet printable UV Masking Black Wax 130 Degree Wax-JCHP7941 made by Luscher. Examples of resin affinity materials include any substrate material that has been treated to allow bonding of the resin to the substrate. For example, plasma, corona, or flame treatment of the surface 18 of the sheet 12 creates the resin affinity material sufficient to allow bonding by the resin.

Figure 2A:
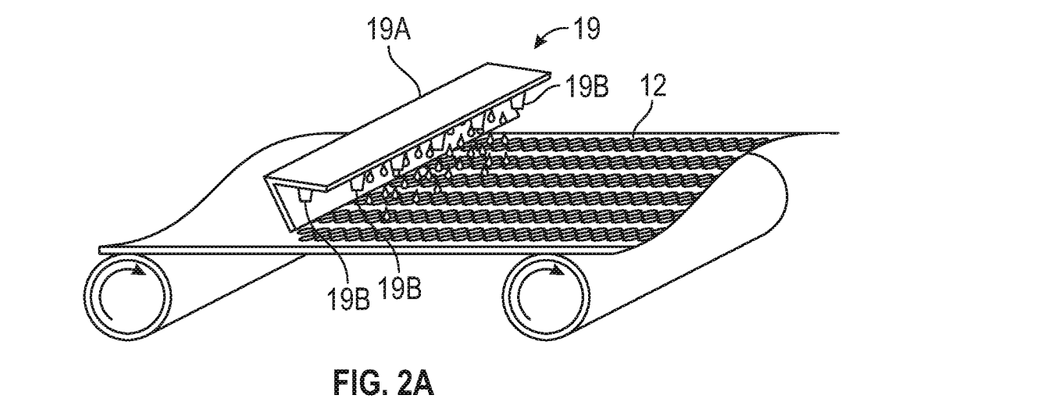
FIG. 2A is a schematic diagram of a printing array used in the system of FIG. 1, according to an exemplary aspect.

The first machine 14 may apply the first phase of treatment onto the sheet 12 in various ways, including printing and coating. Turning briefly to FIG. 2A, a schematic diagram of a printing machine 19 is illustrated for use as the first machine 14. The printing machine 19 may perform at least one of digital printing, screen printing, lithography printing, flexography printing, and offset printing. The printing machine 19 generally includes a printer array 19A having a plurality of printing nozzles 19B. Each of the printing nozzles 19B is configured to apply or print one or a combination of the resin repellant or resin affinity material 16 directly onto the sheet 12 following a preprogrammed pattern. In one aspect, the sheet 12 is moved, for example longitudinally and/or laterally relative to the printer array 19A. In another aspect, the printer array 19A is moved, for example for example longitudinally and/or laterally relative to the sheet 12. The printer array 19A may apply more than one type of material to the sheet 12, for example adhesives and wax. In one aspect of the present disclosure, the printer array 19A prints a desiccant, an e-ink, an antimicrobial material, a fire-retardant material, an activated charcoal, and/or an intumescent material onto the sheet 12. Thus, some of the printing nozzles 19B may print one type of material and others of the printing nozzles 19B may print another type of material. In another aspect, the printing machine 19 may be used in series with another printing machine (not shown). In this aspect, the printing machine 19 applies one of the resin repellant or resin affinity material 16 and the other printing machine (not shown) applies the other of the resin repellant or resin affinity material 16.

Figure 2B:
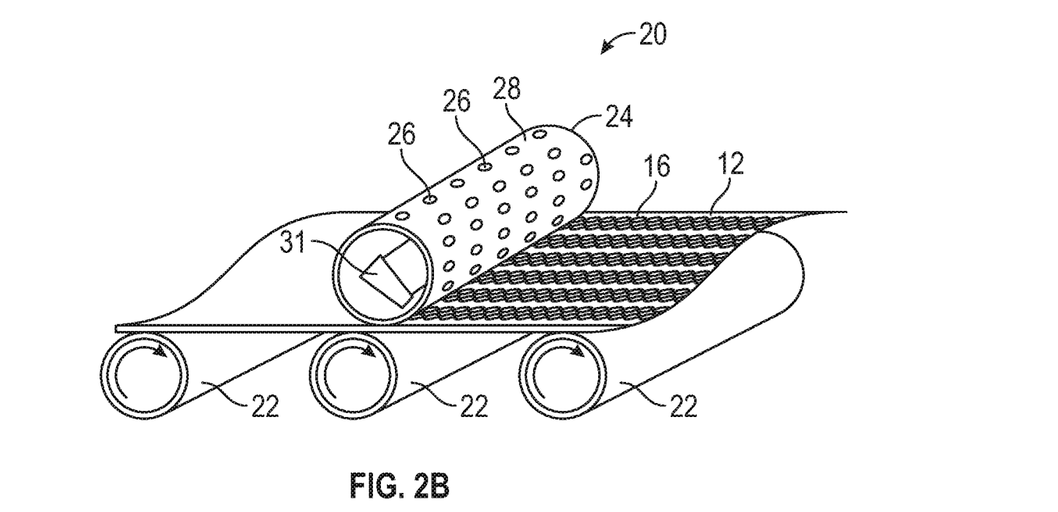
FIG. 2B is a schematic diagram of a rotary coating machine used in the system of FIG. 1, according to an exemplary aspect.
Figure 3:
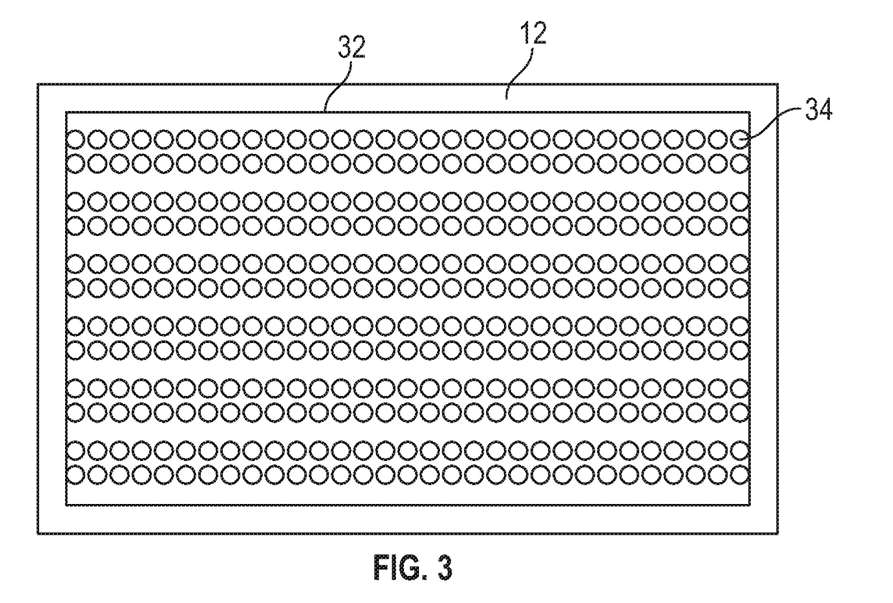
FIG. 3 is a schematic diagram of a mesh screen for coating used in the system of FIG. 1, according to an exemplary aspect.

In another aspect, the resin repellant or resin affinity material 16 is coated onto the sheet 12. The coating includes at least one of coating with and a rotary screen coating or a mesh screen coating. Turning briefly to FIG. 2B, a schematic diagram of a rotary screen coating machine 20 is illustrated for use as the first machine 14. The rotary screen coating machine 20 includes rollers 22 that feed the sheet 12 past a drum 24. The drum 24 is filled with the resin repellant or resin affinity material 16 to be applied to the sheet 12. In one aspect, the drum 24 may be divided (not shown) to apply both the resin repellant material and resin affinity material 16 onto the sheet 12. In another aspect, multiple drums 24 (not shown) may be used in series to apply both the resin repellant material and resin affinity material 16 onto the sheet 12. It should be appreciated that the rotary screen coating machine 20 may include additional rollers, including a roller (not shown) disposed opposite the drum 24 to compress the sheet 12 therebetween. The drum 24 includes apertures 26 disposed through a surface 28 of the drum 30. A squeegee or brush 31 applies the resin repellant or resin affinity material 16 through the apertures 26 onto the sheet 12. Thus, the size, shape, and spacing of the apertures 26 correspond to a desired pattern of the resin repellant or resin affinity material 16 applied to the sheet 12. In one aspect of the present disclosure, a desiccant, an e-ink, an antimicrobial material, a fire-retardant material, an activated charcoal, and/or an intumescent material is coated onto the sheet 12 using the coating machine 20. FIG. 3 illustrates a screen mesh 32 used in mesh screen coating. The screen mesh 32 includes holes 34 disposed therethrough. The screen mesh 32 is disposed over the sheet 12. The resin repellant or resin affinity material 16 is coated onto the sheet 12 through the screen mesh 32 to create a desired pattern. In one aspect, both the resin repellant and resin affinity material 16 is applied through the screen mesh 32.

Returning to FIG. 1, once the resin affinity portion 12A and the resin repellant portion 12B-do we have to dry the applied resin affinity portion 12A and the resin repellant portion 12B have been created on the sheet 12, the sheet 12 is fed into a second machine 36. The second machine 36 is configured to apply a second phase of treatment onto the sheet 12. In one aspect, the applied resin affinity portion 12A and the resin repellant portion 12B are dried before the second phase of treatment begins. The second phase of treatment includes (applying an adhesive 38 onto the surface 18 of the sheet 12. The adhesive 38 is applied to the resin affinity portion 12A. The adhesive 38 is applied as strips 38A onto the sheet 12. Subsequent, alternating sheets 12 have adhesive 38 applied in strips 38B that are offset from the strips 38A in order to form a honeycomb-like structure when expanded. The adhesive 38 may be applied to the sheet 12 using printing or coating, as described above for the first machine 14. In addition, the first machine 14 and the second machine 36 may be switched in the system 10 such that the second machine 36 applies the adhesive 38 onto the sheets 12 before the creation of the resin affinity portion 12A and the resin repellant portion 12B by the first machine 14.

A number of the sheets 12 are then stacked to form a block 40. As noted above, the sheets 12 have alternating strips of adhesive 38. The strips 38A of adhesives 38 and the strips 38B of adhesives 38 adhere the sheets 12 together. The adhesives 38 may be allowed to cure before optionally slicing or cutting the block 40 into sections 42. The sections 42 are then placed into a third machine 44 for expanding the sections 42 to form a honeycomb substrate 46. The honeycomb substrate 46 includes a number of open cells 47 arranged in a honeycomb-like configuration.

The honeycomb substrate 46 is then placed into a dip coating machine 48 to apply a resin over the honeycomb substrate 46. The resin adheres to the resin affinity portions 12A and does not adhere to the resin repellant portions 12B. The resin is preferably a phenolic resin having a surface energy ranging from 40 to 50 dyn/cm. The resin may also include Epoxy and polyester resins. The resin repellant portions 12B, where no resin is adhered to the honeycomb substrate 46, will form venting pathways, as will be described in greater detail below.

The honeycomb substrate 46 is then removed from the dip coating machine 48 and placed in a curing machine 50. The curing machine 50, such as an autoclave, cures the resin on the honeycomb substrate 46 at an elevated temperature. Once cured, the honeycomb substrate 46 is placed in a degrading machine 52. The degrading machine 52 degrades the resin repellant portion 12B to form a honeycomb core 60, shown in FIGS. 4 and 5, having venting pathways 68 that allow outgassing of volatiles. In one aspect, degrading the resin repellant portion 12B includes washing the resin repellant portion 12B in a solvent. In another aspect, degrading the resin repellant portion 12B includes thermally degrading the resin repellant portion 12B. Thermally degrading includes heating the resin repellant portion 12B to degrade the material thereby increasing the porosity of the resin repellant portion 12B. In yet another aspect, degrading the resin repellant portion 12B includes gravity floating the resin repellant portion 12B. Gravity floating includes submerging the honeycomb substrate 46 in a solution (not shown) that allows the resin repellant portion 12B to float in the solution. In one aspect, degrading the resin repellant portion 12B includes degrading the honeycomb substrate 46 to make the honeycomb substrate 46 porous. Once complete, the honeycomb core 60 may be placed in one or more post-processing machines 54 (FIG. 1), such as laminating machines, out-of-autoclave curing machines, etc., to form a final part (not shown).

Figure 4:
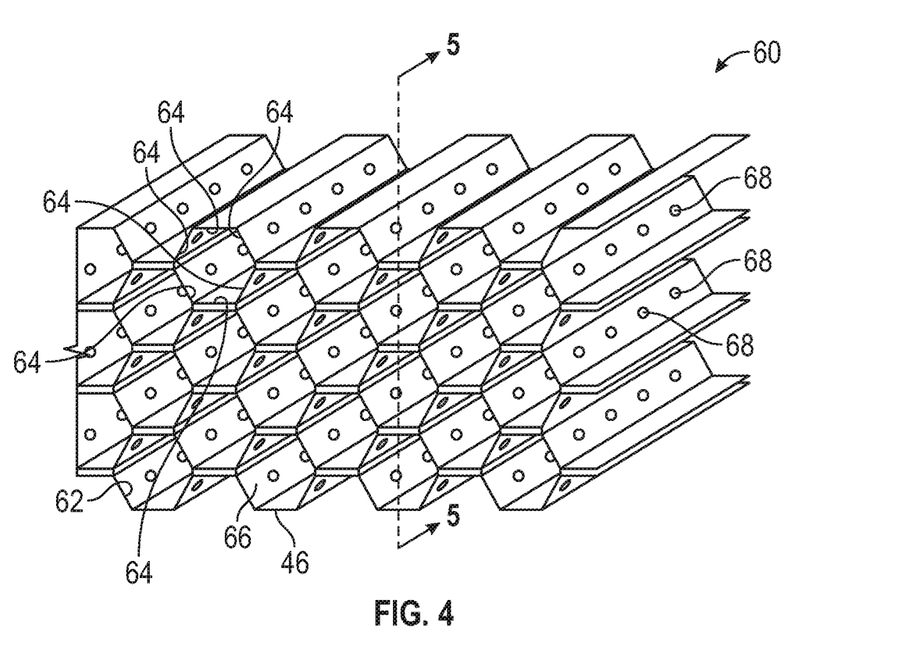
FIG. 4 is an enlarged isometric view of a honeycomb substrate, according to an exemplary aspect.
Figure 5:
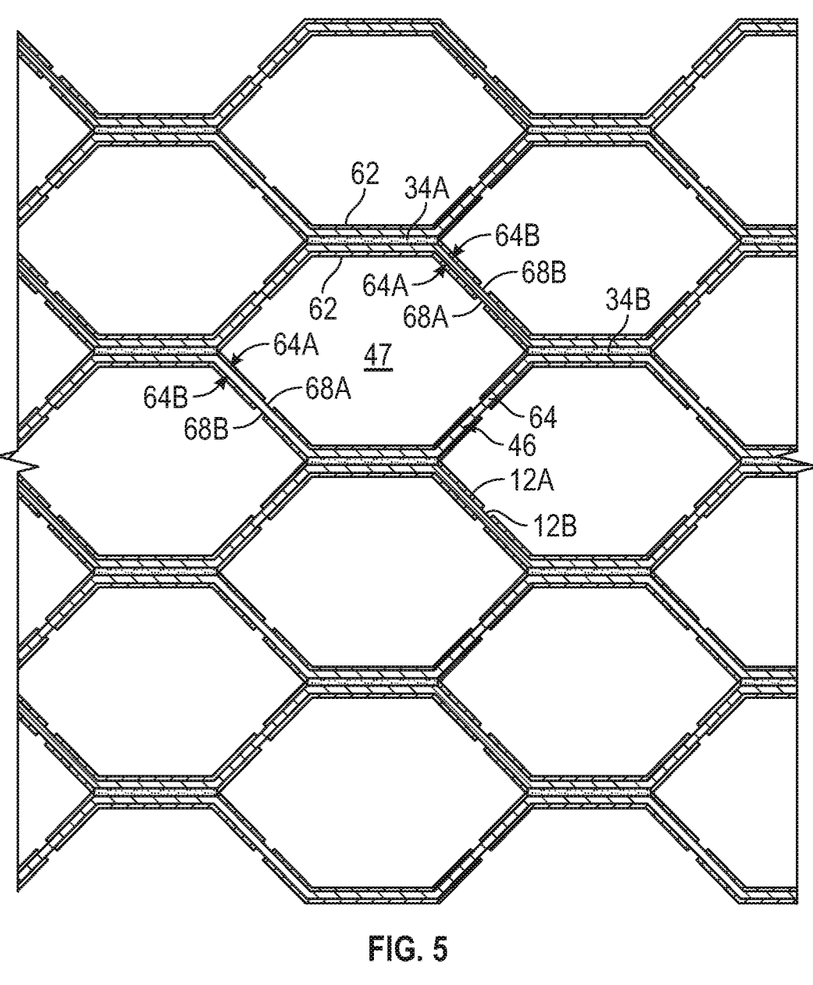
FIG. 5 is cross-section view of a portion of the honeycomb substrate viewed in the direction of arrows 5-5 in FIG. 4, according to an exemplary aspect.

FIG. 4 illustrates an enlarged portion of the honeycomb core 60 produced by the system 10. FIG. 5 illustrates an enlarged cross-section of the honeycomb core 60 viewed in the direction of arrows 5-5 in FIG. 4. The honeycomb core 60 includes the honeycomb substrate 46 and a resin skin 62 disposed overtop the honeycomb substrate 46. The honeycomb substrate 46 includes walls 64 arranged in a honeycomb-like pattern. Six walls 64 are connected to form the open cell 47 in the honeycomb substrate 46. The resin skin 62 is disposed on the walls 64 in the resin affinity portions 12A but is not disposed overtop the walls 64 in the resin repellant portions 12B (shown in FIG. 5). Thus, venting pathways 68 are formed in the resin skin 62. The venting pathways 68 communicate through the walls 64 to the open cell 47. Thus, the venting pathways 68 are defined by inner venting openings 68A formed in the resin skin 62 on an inner side 64A of the walls 64 and outer venting openings 68B formed in the resin skin 62 on an outer side 64B of the walls 64. The inner venting openings 68A and the outer venting openings 68B on the wall 64 are aligned. Thus, the venting pathways 68 are discrete openings formed in the resin skin 62 that allow vapor communication, i.e. vapor propagation, between adjacent ones of the open cells 47. Where the honeycomb substrate 46 is porous, either by degrading or naturally, the vapor communication occurs through the honeycomb substrate 46. Where the honeycomb substrate 46 is non-porous and holes 15 (FIG. 1A) have been formed in the sheets 12 (FIG. 1A), the holes 15 form part of the venting pathways. It should be appreciated that the number and location of venting pathways 68 is controlled by the location of the resin repellant or resin affinity material 16 (FIG. 1) applied to the sheets 12.

Figure 6:
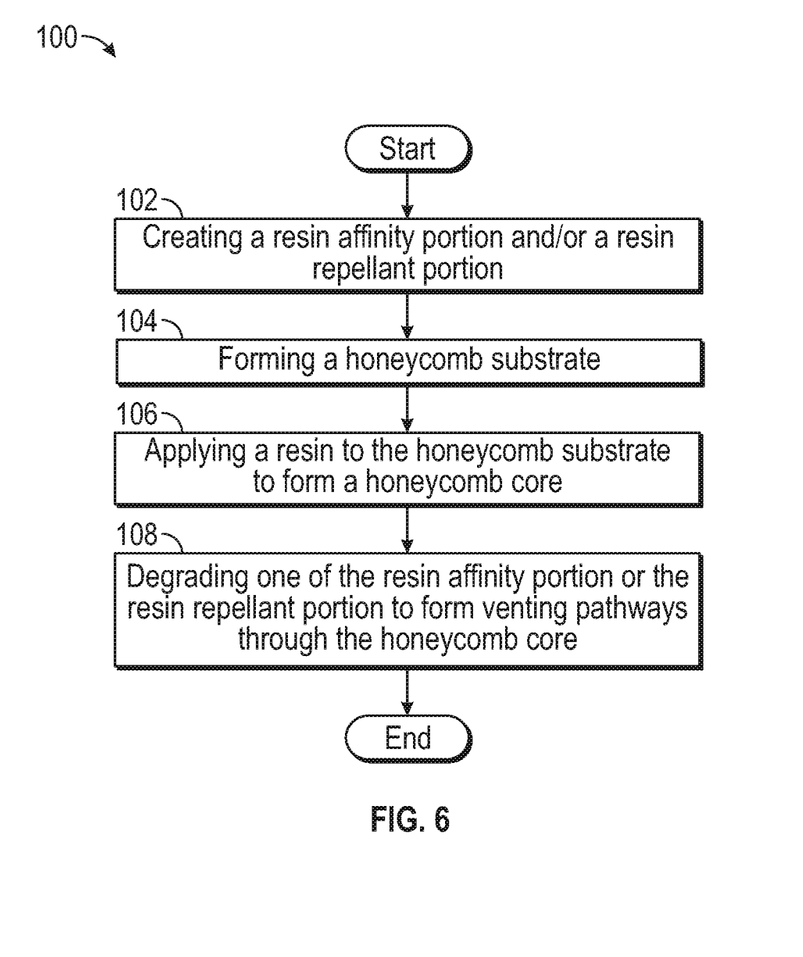
FIG. 6 is an exemplary process flow diagram illustrating a method of creating a honeycomb core having venting pathways using the system of FIG. 1, according to an exemplary aspect.

With reference to FIG. 6, and continued reference to FIGS. 1-5, a flow chart of a method 100 for forming the honeycomb core 60 is illustrated. The method 100 begins at block 102 where the resin affinity portions 12A and the resin repellant portions 12B are created on the sheets 12. Where the sheets 12 are porous, the resin repellant portions 12B are created by applying a resin repellant material to the sheets 12 by the first machine 14. Where the sheets 12 are non-porous or resin repellant, the resin affinity portions 12A are created by applying a resin affinity material to the sheets 12 by the first machine 14. Where the sheets have holes 15 (FIG. 1A) perforated therethrough, the resin repellant portions 12B are aligned with the holes 15. The resin affinity portions 12A or the resin repellant portions 12B may be created by digital printing, screen printing, lithography printing, flexography printing, offset printing, mesh screen coating or rotary screen coating, as described above. The resin affinity portions 12A or the resin repellant portions 12B are applied in a regular, repeating pattern to assure that each open cell 47 (FIG. 5) has a venting pathway 68 (FIG. 5) when cut into sections 42. The location of the resin affinity portion 12A and the resin repellant portion 12B is selected to optimize the performance of the honeycomb substrate 46. Optimizing performance may include selecting for strength or other functions. For example, the pattern may help with enhancing strength (compression strength, shear strength etc.) of the honeycomb substrate 46 relative to other functions. The design parameters include locations, shapes, and number of the venting pathways 68, or the shape of the open cells 47.

Next, at block 104, the honeycomb substrate 46 is formed by applying the adhesive 38 to the sheets 12 and stacking the sheets 12 to form the block 40. The adhesive 38 is applied in strips 38A and strips 38B that are offset from one another on alternating sheets 12. The block 40 is then expanded by the third machine 44 to form the honeycomb substrate 46. It should be appreciated that the block 40 may be cut into sections 42 before or after entering the third machine 44. The method then proceeds to block 106.

At block 106 the resin is applied to the honeycomb substrate 46. The resin will adhere to the resin affinity portions 12A and not adhere to the resin repellant portions 12B. The resin is then cured to form the honeycomb core 60.

At block 108 either the resin affinity portion 12A or the resin repellant portion 12B is degraded by the degrading machine 52. The degrading machine 52 includes at least one of washing the resin repellant portion 12B in a solvent, thermally degrading the resin repellant portion 12B, or gravity floating the resin repellant portion 12B. Degrading the resin repellant portion 12B forms the venting pathways 68 in the honeycomb core 60. In one aspect, the curing machine 50 and the degrading machine 52 are the same machine and heating during curing degrades the resin repellant portion 12B.

Figure 7:
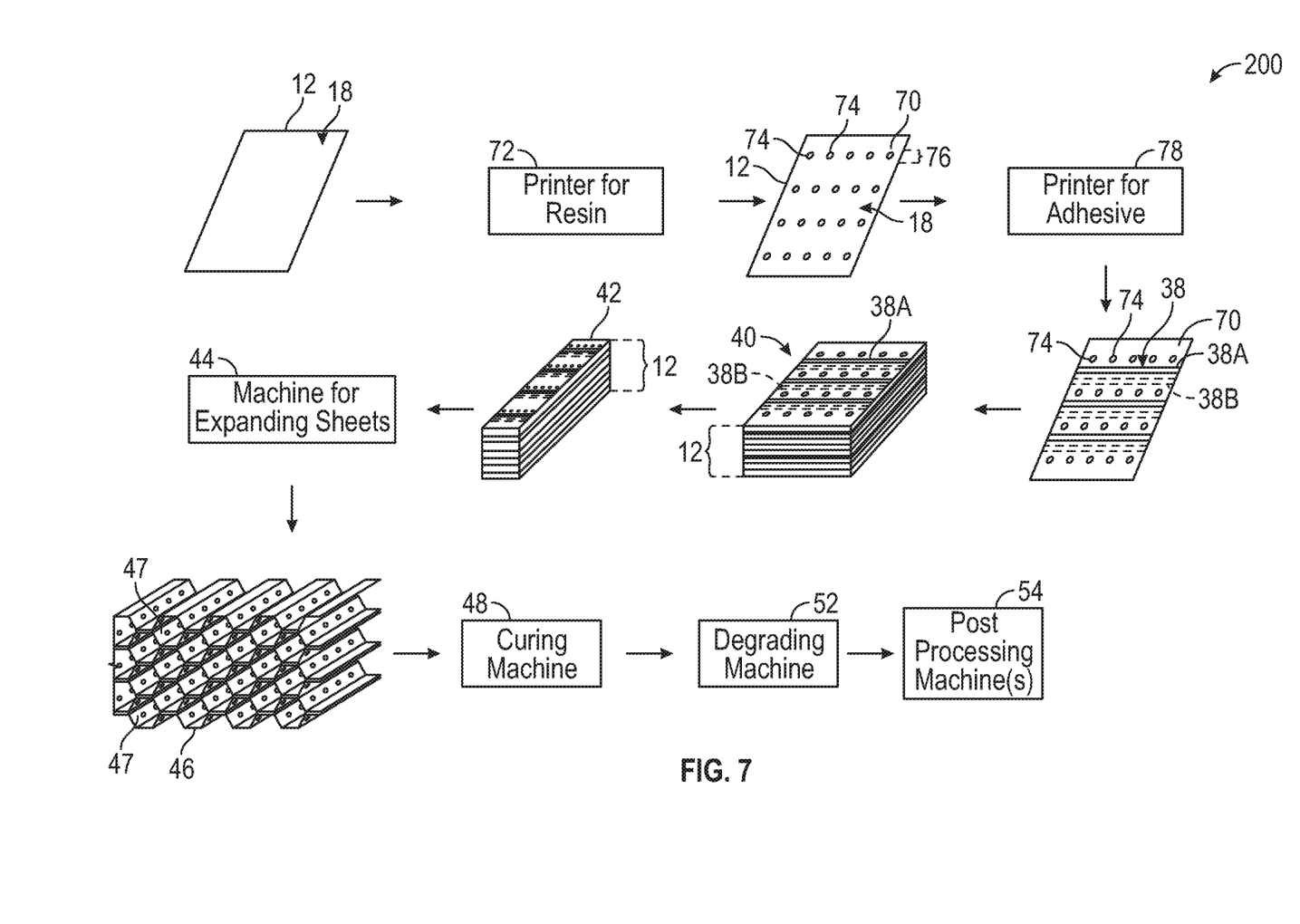
FIG. 7 is a schematic diagram of another system for creating a honeycomb core with venting pathways, according to an exemplary aspect.

FIG. 7 is a schematic diagram of another system 200 for creating the honeycomb core 60. The system 200 is similar to the system 10 and like components are indicated by like reference numbers. However, in the system 200, the dip coating machine 48 is not included. Instead, a resin material 70 is directly printed onto the sheet 12 by a resin printer 72. The resin material 70 is printed onto the sheet 12 to define openings 74 where no resin material 70 is present. The openings 74 are applied in a regular pattern onto the surface 18 of the sheet 12. The shape and pattern of the resin material 70 may vary without departing from the scope of the present disclosure. In the example provided, the resin material 70 is disposed on the surface 18 such that the openings 74 are discrete dots arranged in parallel rows 76 to provide regular venting pathways for each of the open cells 47 in the honeycomb substrate 46. Other arrangements, including non-parallel configurations (not shown) may be employed. The openings 74 are arranged to optimize the performance of the honeycomb substrate 46. Optimizing performance may include selecting for strength or other functions. For example, the arrangement of openings 74 may help with enhancing strength (compression strength, shear strength etc.) of the honeycomb substrate 46. The design parameters include locations, shapes, and number of the openings 74, or the shape of the open cells 47. Where the sheet 12 includes holes 15 (FIG. 1A), the resin material 70 is applied such that the openings 74 align with the holes 15. In one aspect, the resin material 70 is applied to one side of the sheet 12. In another aspect, the resin material 70 is applied to both sides of the sheet 12 to increase the communication between venting pathways by assuring that resin material 70 on alternating, stacked sheets 12 does not block the openings 74. Once the resin material 70 has been applied to the sheet 12, an adhesive printer 78 applies the adhesive 38 onto the surface 18 of the sheet 12. The adhesive 38 is applied as strips 38A onto the sheet 12. Subsequent, alternating sheets 12 have adhesive 38 applied in strips 38B that are offset from the strips 38A in order to form the honeycomb substrate 46 when expanded by the third machine 44.

Figure 8:
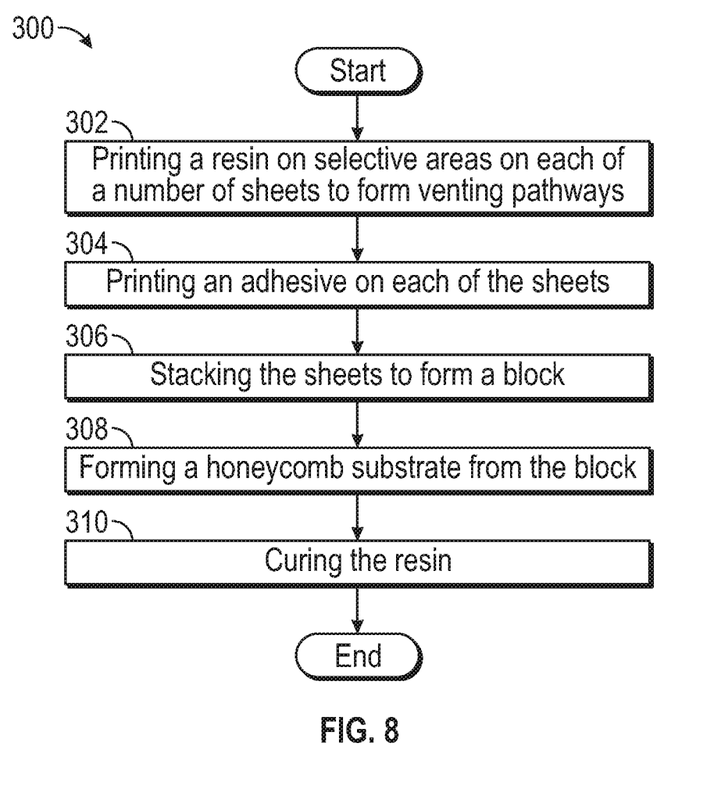
FIG. 8 is an exemplary process flow diagram illustrating a method of creating a honeycomb core having venting pathways using the system of FIG. 7, according to an exemplary aspect.

With reference to FIG. 8, and continued reference to FIGS. 4, 5, and 7, a flow chart of a method 300 for creating the honeycomb core 60 using the system 200 is illustrated. The method 300 begins at block 302 by printing the resin material 70 on selective areas of the sheets 12. As noted above, the resin material 70 is printed to define openings 74 on the surface 18 of the sheet 12. In one aspect, the resin material 70 is printed on one side of each of the sheets 12. In another aspect, the resin material 70 is printed on both sides of the sheets 12.

Next, at block 304, the adhesive 38 is printed on the sheets 12 by the adhesive printer 78. The adhesive 38 is printed in strips 38A and strips 38B that are offset from one another on alternating sheets 12. At block 306 the sheets 12 are stacked to form the block 40. The adhesive 38 adheres the sheets 12 together. At block 308 the honeycomb core 60 is formed by expanding the block 40 using the third machine 44. At block 310 the honeycomb core 60 is cured by the curing machine 50 and the method 300 ends.

The honeycomb core 60 produced using the system 10 with method 100 and the system 200 with the method 300 may be used in various composite parts. The venting pathways 68 allow volatile gasses to escape the honeycomb core 60 without damaging any laminates or surface sheets that may be applied during post processing.

Figure 9:
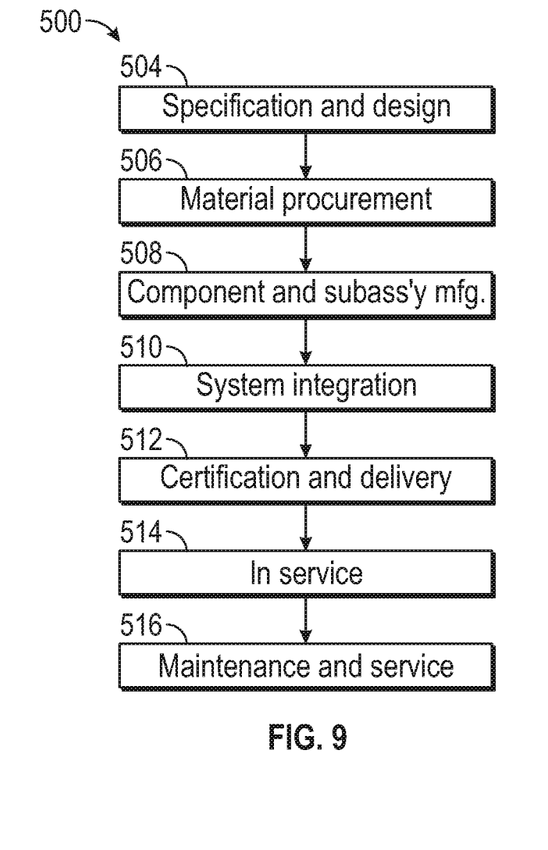
FIG. 9 is a flow diagram of aircraft production and service methodology.
Figure 10:
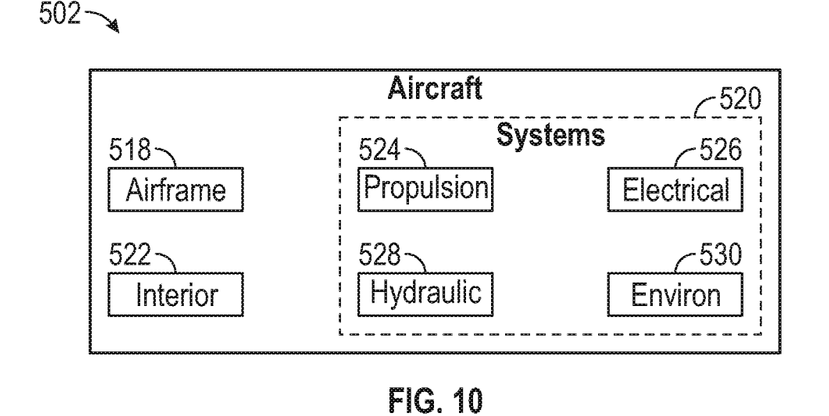
FIG. 10 is a block diagram of an aircraft.

Aspects of the system 10 and the system 200 described above, as well as the method 100 and the method 300, may be employed in the context of an aircraft manufacturing and service method 500 as shown in FIG. 9 and an aircraft 502 as shown in FIG. 10. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of the systems and methods described herein may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 502 produced by exemplary method 500 may include an airframe 518 with a plurality of systems 520 and an interior 522. Examples of systems 520 include one or more of a propulsion system 524, an electrical system 526, a hydraulic system 528, and an environmental system 530. Any number of other systems may be included. Although an aerospace example is shown, the principles of the disclosure may be applied to other industries, such as the automotive industry.

The system and methods described above may be employed during any one or more of the stages of the exemplary method 500. For example, components or subassemblies corresponding to component and subassembly manufacturing 508 may be fabricated or manufactured in a manner similar to components or subassemblies produced while the aircraft 502 is in service. Also, one or more apparatus aspects, method aspects, or a combination thereof may be utilized during the component and subassembly manufacturing 508 and system integration 510, for example, by substantially expediting assembly of or reducing the cost of an aircraft 502. Similarly, one or more of apparatus aspects, method aspects, or a combination thereof may be utilized while the aircraft 502 is in service, for example and without limitation, to maintenance and service 516. Aspects of the system 10 and the system 200 described above, as well as the methods 100 and 300, may be employed with the component and subassembly manufacturing 508, the system integration 510, the routine maintenance and service 516, the airframe 518, and the interior 522.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The following is claimed:

1. A method for creating a honeycomb core having venting pathways formed therethrough, the method comprising:

controlling where a resin is applied to sheets by creating a resin affinity portion and a resin repellant portion on the sheets;

degrading the resin repellant portion to form the venting pathways through the honeycomb core;

forming a honeycomb substrate from the sheets; and applying the resin to the honeycomb substrate to form the honeycomb core.

2. The method of claim 1, wherein degrading the resin repellant portion to form venting pathways through the honeycomb core includes at least one of washing the resin repellant portion in a solvent, thermally degrading the resin repellant portion, or gravity floating the resin repellant portion.

3. The method of claim 1, wherein creating the resin affinity portion and the resin repellant portion on the sheets includes applying a resin repellant to the sheets.

4. The method of claim 3, wherein applying the resin repellant to the sheets includes printing the resin repellant on the sheets.

5. The method of claim 3, wherein applying a resin repellant to the sheets includes coating the sheets with the resin repellant.

6. The method of claim 1, wherein creating the resin affinity portion and the resin repellant portion on the sheets includes applying a resin affinity material to the sheets.

7. The method of claim 6, wherein the sheets are comprised of a resin repellant material.

8. The method of claim 6, wherein applying the resin affinity material to the sheets includes printing the resin affinity material on the sheets.

9. The method of claim 6, wherein applying the resin affinity material to the sheets includes coating the sheets with the resin affinity material.

10. A method for creating a honeycomb core having venting pathways formed therethrough, the method comprising:

applying a resin repellant to sheets to form a resin affinity portion and a resin repellant portion on the sheets;

forming a honeycomb substrate from the sheets; and applying a resin to the honeycomb substrate to form the honeycomb core, wherein the resin repellant portion forms the venting pathways.

11. The method of claim 10, wherein the sheets are comprised of a resin affinity material.

12. The method of claim 10, wherein applying the resin repellant to the sheets includes printing the resin repellant on the sheets.

13. The method of claim 12, wherein printing the resin repellant on the sheets includes at least one of digital printing, screen printing, lithography printing, flexography printing, and offset printing.

14. The method of claim 10, wherein applying a resin repellant to the sheets includes coating the sheets with the resin repellant.

15. The method of claim 14, wherein coating the sheets with the resin repellant includes at least one of coating using a mesh screen coater and coating using a rotary screen coater.

16. The method of claim 10, wherein applying the resin repellant to the sheets includes applying the resin repellant to the sheets in a repeating pattern on selective areas of the sheets.

17. A method for creating a honeycomb core having venting pathways formed therethrough, the method comprising:

applying a resin affinity material to sheets to form a resin affinity portion and a resin repellant portion on the sheets;

forming a honeycomb substrate from the sheets; and applying a resin to the honeycomb substrate to form the honeycomb core, wherein the resin repellant portion forms the venting pathways.

18. The method of claim 17, wherein the sheets are comprised of a resin repellant material.

19. The method of claim 17, wherein applying the resin affinity material to the sheets includes printing the resin affinity material on the sheets.

20. The method of claim 19, wherein printing the resin affinity material on the sheets includes at least one of digital printing, screen printing, lithography printing, flexography printing, and offset printing.

21. The method of claim 17, wherein applying the resin affinity material to the sheets includes coating the sheets with the resin affinity material.

22. The method of claim 21, wherein coating the sheets with the resin affinity material includes at least one of coating using a mesh screen coater and coating using a rotary screen coater.

23. The method of claim 17, wherein applying the resin affinity material to the sheets includes applying the resin affinity material to the sheets in a repeating pattern on selective areas of the sheets.

* * * * *